A. ALLEN.

Fire Alarm Telegraph.

No. 4,013. Reissued June 7, 1870.

Witnesses
Andrew Choffin
Ruth H. Abbott

Inventor
Alexander Allen
by Job Abbott

THE NORRIS PETERS CO., PHOTO-LITHO., WASHINGTON, D. C.

United States Patent Office.

ALEXANDER ALLEN, OF ROCHESTER, NEW YORK.

*Letters Patent No.* 90,806, *dated June* 1, 1869; *reissue No.* 4,013, *dated June* 7, 1870.

DIVISION B.

IMPROVEMENT IN FIRE-ALARM SIGNALS AND APPARATUS.

The Schedule referred to in these Letters Patent and making part of the same.

*To all whom it may concern:*

Be it known that I, ALEXANDER ALLEN, of Rochester, Monroe county, New York, have invented certain new and useful Improvements in Fire-Alarm Signals and Apparatus; and that the following is a full, clear, and exact specification of that part of my invention relating to the mechanical construction of automatic fire-alarm apparatus for fire-alarm telegraphs.

*Nature and Object of my Invention.*

The first part of this invention relates to the combination, in an automatic fire-alarm telegraph apparatus, of a circuit-wheel, mounted on a shaft, provided with a pinion, with a vibrating-gear sector secured on the driving-shaft of the apparatus, and meshing directly into the pinion on the circuit-wheel shaft, said driving-shaft having a winding-lever secured thereon, and being provided with a suitable mechanical motor for producing the automatic rotation of the driving-shaft, on receiving the proper impulse from the winding-lever, whereby the power which causes the rotation of the circuit-wheel is applied directly to the shaft of the circuit-wheel, instead of being transferred through a train of gearing, as in former constructions, thus avoiding the loss of power, due to the gear and axle friction, which is invariably developed in transferring power through a gear-train, and making the apparatus less liable to be affected in its movements by the moisture and rust which accumulate in the signal-box in practice.

The second part of this invention relates to limiting the amount of rotation on the shaft, on which is secured the winding-lever of the apparatus, by means of fixed stops, acting in combination with the gear-sector secured on said shaft, for the purpose of limiting the length of the fire-alarm signal given by the apparatus, whereby the person actuating the mechanism is prevented from winding up the apparatus more than is necessary to produce the required length of signal, thus making the alarm-signal of a precise and definite length, by which economy of time is effected, and the liability of a mistake in getting the number of the box or station giving the alarm is materially diminished, as is hereinafter more fully shown.

The third part of this invention relates to the combination of a train of gear, with regulating device, with the mechanism for automatically producing a limited number of rotations of the circuit-wheel, whereby the automatic movement of the circuit-wheel is regulated, so as to be uniform throughout its extent, for the purpose of securing the regularity of the blows or taps constituting the fire-alarm signal.

The fourth part of this invention relates to an improved construction of the lever or key, which acts, in combination with the circuit-wheel, in breaking the circuit, said lever or key being so constructed as to allow the notches or pins in the circuit-wheel to pass under it during a backward movement of said wheel, without affecting the continuity of the circuit, but insuring the breaking of the circuit at the passing of each notch or pin on the circuit-wheel during a forward rotation of said wheel.

*Description of the Accompanying Drawing.*

*General Description of Apparatus.*

A A are the frame-plates of the apparatus, which are united by the standards *a a a a*, and in which are drilled holes to receive the journals of the shafts, on which are secured the various wheels in the machine.

The main shaft *b* is arranged in the lower part of the plates A A, and is extended out in front of the front plate A, where the winding-lever B, provided with knob or handle C, is secured on it.

The circular box F is secured to the front plate A, and in it, and around the shaft *b*, is arranged the spring E, one end of which is secured to the side of the box F, and the other end to the shaft *b*.

The geared sector D is secured on the shaft *b*, and meshes into the pinion G, secured on the shaft *c*, on which shaft is also secured the ratchet-wheel I and the circuit-wheel H.

This shaft *c* also serves as a journal for the wheel J, which meshes into the pinion K, secured on the shaft *d*, on which shaft is also secured the wheel L.

This wheel L meshes into the pinion M on the shaft *e*, on which shaft is also secured the wheel N, which meshes into the pinion O on the shaft *f*, on which is secured the fan W, which acts as a regulator to the machine.

Figure 3:
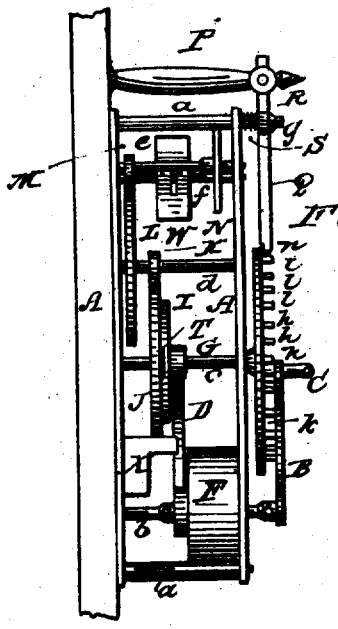
Figure 3 is a front view of the same, with front plate, circuit-wheel, winding-lever, and key removed.

The pawl T is pivoted on the wheel J, and is held down so as to engage with the ratchet-teeth on the wheel I, by the spring U, as shown in fig. 3.

Figure 1:
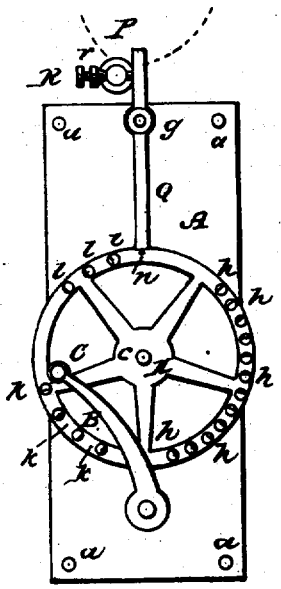
Figure 1 is a front view of an apparatus embodying my invention.
Figure 2:
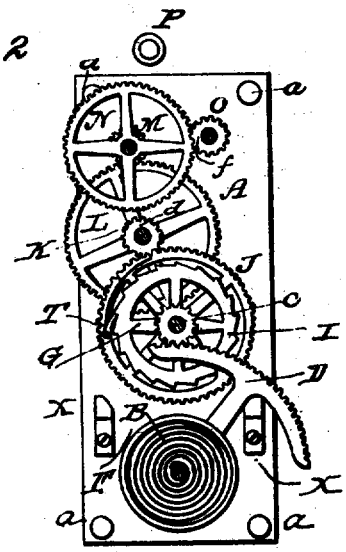
Figure 2 is a side view of the same.
Figure 4:
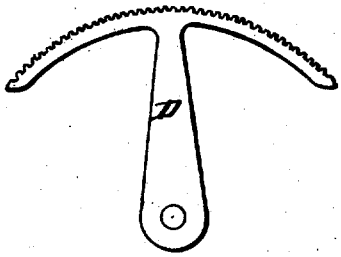
Figure 4 is a front view of the geared sector in said apparatus.

In the side of the circuit-wheel H are arranged the pins *h h k k l l*, as shown in figs. 1 and 2, the arrangement of said pins depending on the character of the signal to be sounded, as well as on the number of the box or station at which the apparatus is to be located.

In the construction shown, the pins are arranged to give a fire-alarm with the improved system of signals described and claimed in Division A of the reissued Letters Patent, to which reference is made for a fuller description; but it may be here briefly stated that this system of signals consists of a series of alarm-signals, consisting each of several rapid blows or taps, and of a series of box-signals, consisting each of several blows or taps, indicating the number of the box or station giving the alarm, the alarm-signals and box-signals being so arranged that an alarm-signal is interposed between any two successive box-signals.

In this case the number of blows or taps used to make an alarm-signal is taken as twelve, and the number of the box or station at which the apparatus is supposed to be located is taken as forty-three, so that twelve "alarm-signal pins" *h h* are arranged at short and equal spaces from each other; then, after leaving a considerable space, the four "box-signal pins" *k k* are arranged at equal distances from each other, but at somewhat greater distances than those between the pins *h h;* then, after leaving a considerable space, the three box-signal pins *l l* are arranged at the same distances from each other as was left between the pins *k k*.

Figure 5:
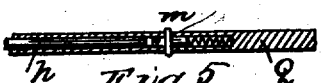
Figure 5 is a longitudinal section of the key or pivoted lever.

The lever Q is pivoted on the standard *g* in the front plate A, and in the lower end of said lever is inserted the sliding rod *u*, which is kept pressed down by the spring *q* placed above it in the hole in the lever Q, and which is held from sliding out, or from turning around, by the pin *m* in the lever Q, which fits in the slot *r* cut in one side of the rod *u*, as fully shown in fig. 5.

The standard P is secured in the side or back of the signal-box in which the apparatus is placed, and the screw R is arranged in the head of said standard, and is firmly held in any desired position by the clamp-nut *v*, as shown in fig. 1.

The spiral spring S is arranged around the standard *g*, and has one end secured to said standard, or to the front plate A, and the other end to the lever Q, and acts to keep the said lever pressed up against the end of the screw R.

One end of the wire forming the fire-alarm telegraph circuit, in which the apparatus is placed, is attached to the standard P, and the other end of the circuit-wire is attached to the lever Q, as indicated by dotted lines in fig. 1.

From the foregoing description it is readily seen that, by drawing the winding-lever B to the left, by means of the knob C, the spring E will be drawn up, so that, on releasing said winding-lever, said spring will act to cause an automatic rotation of the shaft *b* from left to right.

The drawing of the winding-lever B from right to left causes a corresponding movement of the geared sector D, and causes a rotation of the circuit-wheel H from the left to right, the gear-train *f* K L M N O being allowed to remain at rest during this movement, by the sliding of the pawl T over the teeth of the ratchet-wheel I.

This rotation of the circuit-wheel H from left to right, which is termed a "backward rotation," is permitted without causing any vibration of the lever Q, or in any way affecting the continuity of the circuit, by beveling off the lower end of the sliding rod *u* in said lever, so that, as the pins *h k l* come up to said lever, they strike the beveled face of the rod *u*, and raise it up sufficiently to allow of their passing under it, as is readily seen.

The action of the spring E, in causing a rotation of the shaft *b*, with the geared sector D, from left to right, causes a rotation of the circuit-wheel H from right to left, which is termed a "forward rotation," and which causes the pins *h k l* to strike the square side of the rod *u*, thus causing the lever Q to vibrate, and breaking the circuit by breaking the contact between said lever and the screw R.

When a pin has vibrated the lever Q sufficiently to allow of its passing under the rod *u*, said rod passes over the pin, when the action of the spring S brings the lever Q back to its original position against the screw R, thus closing the circuit.

The gear-train J K L M N O, with its regulating-fan W, is put in motion during the forward rotation of the circuit-wheel H, by the pawl T engaging with the teeth of the ratchet-wheel I, by which a uniform rotation of said circuit-wheel is secured, as is readily seen.

It is evident that, if the amount of rotation of the shaft *b* were not limited, or even if it were limited in its automatic rotation from left to right, the person operating the winding-lever B might draw the same over more or less than the proper amount to produce the required length of signal, which would cause too much or too little rotation of the circuit-wheel H, thus making the signals of an indefinite length.

To prevent this difficulty, the stops X X are secured to the back plate A in such a position as to be struck by the arm of the geared sector D, upon a partial rotation of the same in either direction, by which the amount of rotation in said geared sector, and, consequently, of the shaft *b*, is limited to any required degree, so that the person operating the winding-lever B can only draw up the spring E to such a degree as will be effected by the movement of the geared sector D, from one stop X to the other, which drawing up of said spring can only cause such a limited number of forward rotations of the circuit-wheel H as will be produced by the action of the geared sector D upon the pinion G during the movement from the stop X, against which it was drawn, back to the stop X, against which it rested before the spring E was drawn up.

By applying the limiting-stops to the geared sector D, the limitation of the movement is applied directly to the gear which drives the circuit-wheel shaft, so that there is no possibility of any variation in the length of the signal, as might be the case were the limitation applied to the winding-lever, or any separate arm on the driving-shaft, which might work loose, and thus allow the driving-shaft and gear-sector to rotate more or less than the proper amount.

Said stops are also brought inside of the frame-work A A, where they are out of the way, and are not liable to be bent or broken, and where they do not deface or detract from the external appearance of the mechanism in the signal-box.

It is evident that, where any fixed part of the frame-work is in the proper position to act as a stop to the geared sector, it will answer the same purpose as that of the separate stop shown; or, that the stops might act in combination with a pin or screw inserted in the side of the gear-sector, in place of striking the body of the said sector, and that various modifications of the details of the arrangement of stops, acting in combination with the geared sector, can be made to meet the requirements of particular constructions, the general principle of limiting the movement of the geared sector by means of fixed stops acting in combination therewith, remaining the same, in all cases.

In the example shown in drawing the apparatus is arranged to give a fire-alarm, consisting of three alarm-signals and three box-signals, and, as one complete forward rotation of the circuit-wheel H causes an alarm-signal, and one box-signal, as will be evident from the foregoing description of the arrangement of the pins *h h k k l l*, the sizes of the geared sector D and pinion G, and the relative position of the stops X X with respect to the geared sector D, are so adjusted as that the movement of the said geared sector from one stop to the other shall cause three rotations of the pinion G, and, consequently, of the circuit-wheel H, thus producing the required length of alarm, as is readily seen.

The advantages resulting from this limiting of the fire-alarm, by the method herein described, consist in the economy of time effected, by which the circuit is not taken up by the transmission of any particular fire-alarm, any longer than is actually necessary for the giving of said alarm, so that, if a second fire break out near another station in the same circuit during the giving of the fire-alarm at the first station, there will be but little delay in getting the circuit for the transmission of this second fire-alarm, thus allowing of the same circuit being extended over a district with a much larger number of stations than would be practical were the alarms of an indefinite length.

A second and important advantage is obtained by limiting the length of the signal to a definite point, in either direction, in the lessening of the liability to mistake in getting the number of the box or station giving the alarm, especially when no alarm-signals are interposed between the box-signals, as is the ordinary practice; for, if we represent a blow or tap by a vertical line, |, and the spaces between the box-signals, or parts of the same, by a dash —; and suppose the alarm-signals to be omitted, the fire-alarm from station 43 would be represented thus: ||||–|||—||||–||| —||||–|||; and, if the attendant who was to receive the alarm did not hear the first part of the first box-signal, he could readily mistake station 43 for 34, by getting the last part of one box-signal and the first part of the next together; but if he knows that the signal is limited, and of a definite termination, he has only to wait until the alarm is finished, when, by noticing whether the last part of the signal was 4 or 3, he can easily tell whether the correct number was 43 or 34; while he knows that if the alarm has a definite commencement, and hears the first part of the box-signal, he can at once give the alarm to the fireman without having to wait until the alarm is completed to be sure he has the correct number of the station giving the alarm.

It is also seen that notches in the face of the circuit-wheel H might be used in place of the pins *h k l*, or, that said pins might be arranged in the face instead of in the side of said circuit-wheel, the lever or key Q being conveniently arranged, in these cases, directly over the face of the circuit-wheel H, instead of being at one side of it, as now shown.

I do not claim the combination of a circuit-wheel, mounted on shaft with pinion, with a vibrating gear-sector secured on a driving-shaft, provided with a mechanical motor and winding-lever, except when said gear-sector meshes directly into said pinion on the circuit-wheel shaft; nor do I claim limiting the rotation of the main driving-shaft, except by means of fixed stops acting in combination with the gear-sector on said shaft; nor do I claim the gear-train with its regulating device, except in combination with the construction herein set forth.

*Claims.*

What I claim as my invention, and desire to secure by these reissued Letters Patent, is—

1. The combination of the circuit-wheel H, shaft *c*, pinion G, vibrating gear-sector D, driving-shaft *b*, mechanical motor E, and winding-lever B, said gear-sector meshing directly into the pinion G, substantially as and for the purpose specified.

2. Limiting the rotation of the main driving-shaft of an automatic fire-alarm apparatus, in either or both directions, by means of fixed stops acting in combination with the gear-sector on said shaft, for the purpose of limiting the length of the fire-alarm given by said apparatus, substantially as is herein set forth.

3. The combination of the spring E, or it equivalent, shaft *b*, gear-sector D, shaft *c* with pinion G, ratchet-wheel I, and circuit-wheel H secured thereon, gear-wheel J, with pawl T and spring U secured thereon, gear-train K L M N O, and shaft *f* with regulator W thereon, the several parts being arranged and operating as and for the purpose specified.

4. The lever or key Q, having the sliding rod *u* arranged thereon, when used in combination with the circuit-wheel H, provided with the pins or notches *h k l*, the several parts being arranged substantially as is herein specified.

5. The combination of the standard P, having one end of the main circuit attached thereto, lever or key Q, having the other end of the main circuit attached thereto, and with the sliding rod *u* arranged therein, circuit-wheel H, provided with pins or notches *h k l*, shaft *c*, pinion G, geared sector D, shaft *b*, and spring E, or its equivalent, the several parts being arranged and operating as and for the purpose specified.

As evidence of the foregoing amended specification and claims, I have hereunto set my hand, this 2d day of May, A. D. 1870.

ALEXANDER ALLEN.

Witnesses:
S. D. CUSHMAN,
D. L. WOOD.